US007596241B2

(12) United States Patent
Rittscher et al.

(10) Patent No.: US 7,596,241 B2
(45) Date of Patent: Sep. 29, 2009

(54) SYSTEM AND METHOD FOR AUTOMATIC PERSON COUNTING AND DETECTION OF SPECIFIC EVENTS

(75) Inventors: Jens Rittscher, Schenectady, NY (US); Peter Henry Tu, Schenectady, NY (US); Nils Oliver Krahnstoever, Albany, NY (US); Amitha Perera, Clifton Park, NY (US); Thomas Baby Sebastian, Flemington, NJ (US); Xiaoming Liu, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 694 days.

(21) Appl. No.: 11/290,672

(22) Filed: Nov. 30, 2005

(65) Prior Publication Data

US 2007/0003141 A1     Jan. 4, 2007

Related U.S. Application Data

(60) Provisional application No. 60/695,632, filed on Jun. 30, 2005.

(51) Int. Cl.
*G06K 9/00* (2006.01)
*G06K 9/38* (2006.01)

(52) U.S. Cl. ....................... 382/103; 382/173
(58) Field of Classification Search ....................... None
See application file for complete search history.

(56) References Cited

U.S. PATENT DOCUMENTS 7,356,425 B2 * 4/2008 Krahnstoever et al. ........ 702/94

FOREIGN PATENT DOCUMENTS

JP        6-223157      *  8/1994

OTHER PUBLICATIONS

Mikolajczyk et al., "Human Detection Based on a Probabilistic Assembly of Robust Part Detectors," Proc. $8^{th}$ European Conf. Computer Vision, Prague, Czech Republic, vol. 1, pp. 69-82, 2004.*
Giebel, J., et al., "A Bayesian Framework for Multi-cue 3D Object Tracking", ECCV 2004, LNCS 3024, To. Pajdla and J. Matas (Eds.): pp. 241-252 (2004).
Stauffer, C., et al., "Adaptive background mixture models for real-time tracking", CVPR99 vol. II, pp. 246-252 (1999).
Zhao, T., et al., "Bayesian Human Segmentation in Crowded Situations", IEEE Computer Vision and Pattern Recognition, vol. 2, pp. 459-466, Madison, WI (2003).

(Continued)

*Primary Examiner*—Charles Kim
(74) *Attorney, Agent, or Firm*—Joseph J. Christian

(57) ABSTRACT

A system for detecting and counting individuals in a stationary or moving crowd based on a digital or digitized image captured from a single camera. Initial information is assumed based on a foot-to-head plane homology, where a geometric construct is developed to best enclose image features with a high probability of being an individual within a crowd. These geometric constructs are then subjected to further probabilistic analysis to determine individuals. The vector track of each individual is determined to validate the determination of a group of features as individuals, thereby compensating for occlusion of an individual within any given frame image. A virtual gate is then employed to count the individuals moving past the virtual gate. Also, by weighting portions of the individual, events near the gate can be predicted.

5 Claims, 7 Drawing Sheets

OTHER PUBLICATIONS

Mikolajczyk, K., et al., "Human detection based on a probabilistic assembly of robust part detectors", Proc. 8$^{th}$ European Conference Computer Vision, vol. I, pp. 69-82, Prague, Czech Republic (2004).

Mittal, A., et al., "M2Tracker: A Multi-View Approach to Segmenting and Tracking People in a Cluttered Scene Using Region-Based Stereo", Proc. 7$^{th}$ European Conference Computer Vision, vol. X, pp. 18-33, Kopenhagen, Denmark (2002).

Nakajima, C., et al., "People Recognition in Image Sequences by Supervised Learning", MIT 41 Memo No. 1688, C.B.C.L. Paper No. 188 (Jun. 2000).

Blackman, Samuel et al., "Design and Analysis of Modern Tracking Systems", Artech House radar library, pp. 360-369.

Senior, A., "Tracking people with probabilistic appearance models", ELCV Workshop on Performance Evaluation of Tracking and Surveillance Systems, pp. 48-55 (2002).

Chui, H., et al., "A new point matching algorithm for non-rigid registration", Computer Vision and Image Understanding, vol. 89 (3), pp. 114-141 (Mar. 2003).

Krahnstoever, N., et al., "Bayesian Autocalibration for Surveillance", Tenth IEEE International Conference on Computer Vision (ICLV '05), vol. 2 (Oct. 2005).

Yang, D., et al., "Counting People in Crowds with a Real-Time Network of Simple Image Sensors", Proc. 9$^{th}$ International Conference on Computer Vision, pp. 122-129, Nice, France (2005).

Haritaoglu, I., et al., "Hydra: Multiple People Detection and Tracking Using Silhouettes", IEEE International Workshop on Visual Surveillance, pp. 6-13 (1999).

Gavrila, D.M., "Pedestrian Detection from a Moving Vehicle", Proc. of the European Conference on Computer Vision, pp. 37-49 (Dublin, 2000).

Ioffe, S., et al., "Probabilistic Methods for Finding People", International Journal of Computer Vision vol. 43(1), pp. 45-68 (2001).

Zhao, T., et al., "Tracking Multiple Humans in Complex Situations", IEEE Transactions on Pattern Analysis and Machine Intelligence, vol. 26, No. 9, pp. 1208-1221 (Sep. 2004).

Hartley, R., et al., Multiple View Geometry in Computer Vision, pp. 71-76, Cambridge University Press, Cambridge, UK (2000).

Rittscher et al., Simultaneous Estimation of Segmentation and Shape, pp. 1-8.

* cited by examiner

SYSTEM AND METHOD FOR AUTOMATIC PERSON COUNTING AND DETECTION OF SPECIFIC EVENTS

CROSS REFERENCE TO RELATED APPLICATIONS

This application claims the benefit of U.S. provisional application No. 60/695,632 filed Jun. 30, 2005, which is incorporated herein in its entirety by reference.

BACKGROUND

The invention relates generally to a system and method for identifying discrete objects within a crowded environment, and more particularly to a system of imaging devices and computer-related equipment for ascertaining the location of individuals within a crowded environment.

There is a need for the ability to segment crowded environments into individual objects. For example, the deployment of video surveillance systems is becoming ubiquitous. Digital video is useful for efficiently providing lengthy, continuous surveillance. One prerequisite for such deployment, especially in large spaces such as train stations and airports, is the ability to segment crowds into individuals. The segmentation of crowds into individuals is known. Conventional methods of segmenting crowds into individuals utilize a model-based object detection methodology that is dependent upon learned appearance models.

A number of surveillance applications require the detection and tracking of people to ensure security, safety, and site management. Examples include the estimation of queue length in retail outlets, the monitoring of entry points, bus terminals, or train stations.

Also, automatic monitoring of mass experimentation on cells involves the high throughput screening of hundreds of samples. An image of each of the samples is taken, and a review of each image region is performed. Often, this automatic monitoring of mass experimentation relates to the injection of various experimental drugs into each sample, and a review of each sample to ascertain which of the experimental drugs has given the desired effect.

Substantial progress has been made in detecting individuals in constrained settings, i.e., frames of reference in which the size and/or shape of the individuals are assumed. To achieve this, it is often assumed that the individuals in the frame of reference are well separated and that identifying foreground objects is possible using a statistical background model. Certain actions can only be detected if the location of all individuals in the frame of reference is known. However, in all of the scenarios just mentioned, the individuals actually appear in groups. Additionally, the number of individuals present in the frame of reference may also be desired to be known.

Various techniques have been applied to construct fast and reliable individual detectors, for example, for surveillance applications. Classification techniques can be applied to decide if a given image region contains a person. The use of Support Vector Machines is one way to approach this problem. Another method for solving this problem is using a tree based classification to represent possible shapes of individuals within a group. Yet another way to determine if a region contains a person is to use dynamic point distribution models.

An alternative to modeling the appearance of an entire individual is to design detectors for specific parts of the individual, such as a head or a foot of a human or the neck of a bottle, and combine the result of the detection of those specific parts. The idea of learning part detectors using Ada-Boost and a set of weak classifiers is one approach to this problem. A learning approach is then being used to combine the set of weak classifiers to body part detectors, which are further combined using a probabilistic person model. All these approaches require a fair amount of training data to learn the parameters of the underlying model. Although these classifiers are robust to limited occlusions, they are not suitable to segment a group into individuals, especially when the individuals within the group have freedom of movement, such as crowds of animals or people.

One way in which segmenting a group into individuals has been achieved is to use the information available from several frames of reference, for example, various views from multiple cameras. For example, the M2-tracker explicitly assigns the pixels in each camera view to a particular person using color histograms. A. Mittal and L. S. Davis, *M2tracker: A multi-view approach to segmenting and tracking people in a cluttered scene using region-based stereo*, PROC. $7^{TH}$ EUROPEAN CONF. COMPUTER VISION, Kopenhagen, Denmark, vol. X, pp. 18-33 (2002)

Another way of resolving multiple camera views is by using the camera calibration to locate possible head locations using a head detector. The locations of all individuals in a scene are estimated by maximizing an observation likelihood using Markov Chain Monte Carlo. In this situation, it is extremely helpful to know the location of the ground plane and the camera parameters, as the head detector is based on edge information. However, under certain imaging conditions, extracting clean edge maps can be challenging. Additionally, installing multiple cameras is expensive, and managing the acquisition and analysis of the images from all of the cameras is complex and expensive.

A traditional non-video way of counting individuals is to use turnstiles. However, the installation of the turnstiles can be costly, both in initial expense and in the loss of floor space and flexibility of entrance/egress.

As such, a need exists for a way to analyze a frame of reference to segment a group into individuals for counting and tracking without the need for multiple frames of reference. A further need exists for using this information to determine likely action scenarios of individuals within a group.

SUMMARY

Therefore, according to one aspect of the invention, a system for segmenting a crowd into individual objects includes an image capturing system and a computing system connected to the image capturing system. The computing system utilizes a foot-to-head plane technique to segment the crowd.

According to another aspect of the invention, a method for counting at least one individual in a crowd comprises the steps of (i) calibrating an image capturing device and an image processing device; (ii) capturing a frame of an image with the image capturing device; (iii) drawing a virtual gate through the image; (iv) applying a foreground estimation module to the image; (v) applying a tracking module to the image; (vi) applying a crowd segmentation module to the image to separate the individual from the crowd; and (vii) counting the individual.

According to another aspect of the invention, a method for detecting an event comprises the steps of: (i) calibrating an image capturing device and an image processing device; (ii) capturing a frame of an image with the image capturing device; (iii) drawing a boundary of a zone of interest in the image; (iv) applying a foreground estimation module to the image; (v) applying a crowd segmentation module to the image to separate the individual from the crowd; (vii) identifying a point on the individual; and (viii) determining the location of the point with respect to the boundary.

BRIEF DESCRIPTION OF THE DRAWINGS

These and other features, aspects, and advantages of the invention will become better understood when the following detailed description is read with reference to the accompanying drawings in which like characters represent like parts throughout the drawings, wherein.

DETAILED DESCRIPTION OF EXEMPLARY EMBODIMENTS

As illustrated in the accompanying drawings and discussed in detail below, an exemplary embodiment of the invention is directed to a system to detect individuals within a crowd for counting and other purposes. Applications for embodiments of the invention are described above and below and include use in security and quality assurance applications. It should be appreciated, however, that the embodiments of the invention are not limited to the discussed applications.

Figure 1:
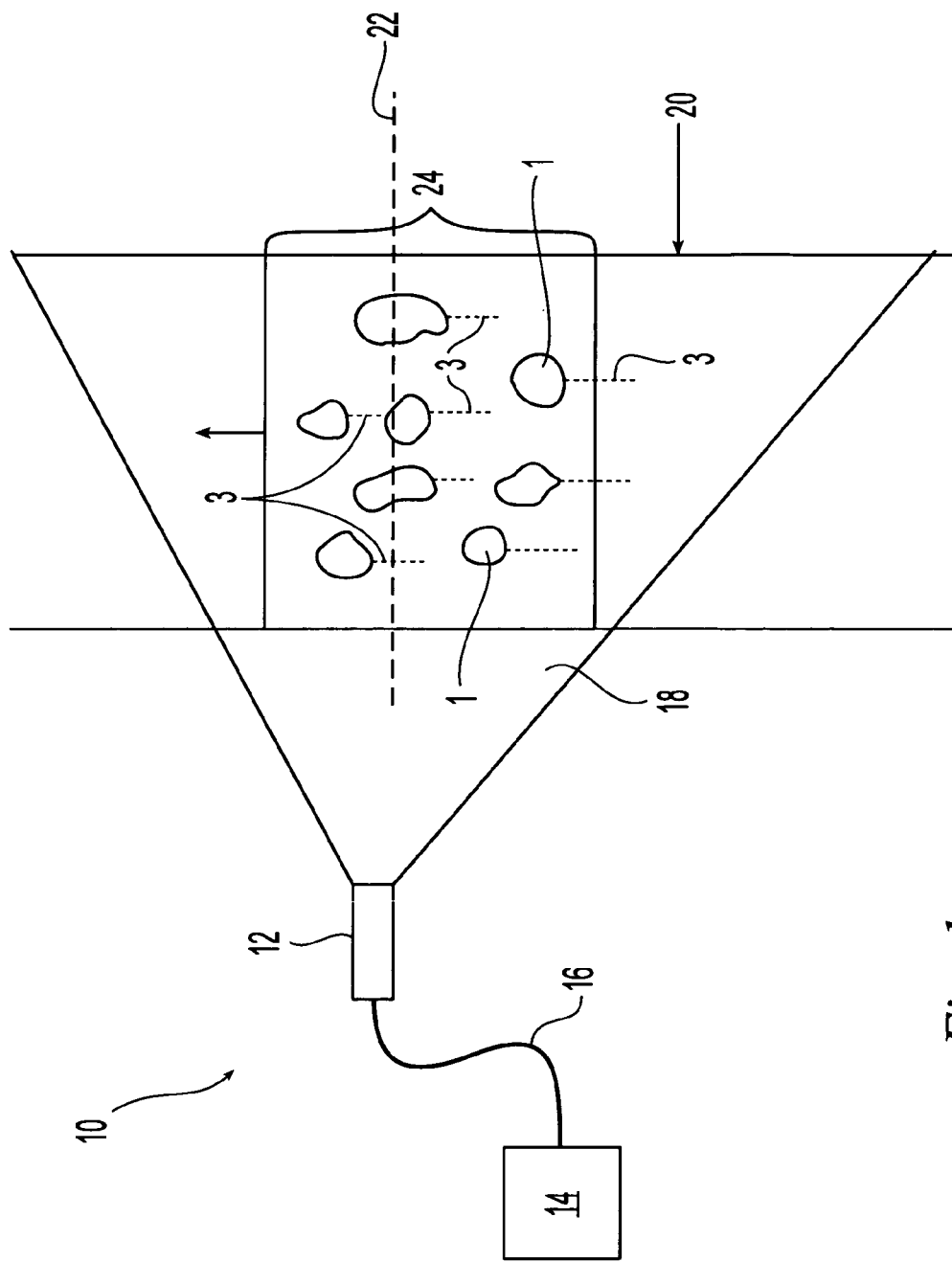
FIG. 1 is a schematic view of a system for counting objects and detecting events according to an embodiment of the invention.

FIG. 1 illustrates a system 10 for segmenting and counting a crowd of individuals 1 within an area of interest 20. The individuals 1 may be any type of object or animal, including humans, livestock, bottles, cans, consumer products, or the like. The individuals 1 may be either stationary or ambulatory. For example, the individuals 1 may be a group of people, people walking, roaming livestock, or objects moved on a conveyor belt. Similarly, the area of interest 20 may be any fixed location, such as a building entrance, an airport security gate, a livestock pen, a section of a production line, or the like.

The system 10 includes an image capturing device 12. Preferably, only one fixed-location image capturing device 12 is used, although certain applications may require additional image capturing devices 12 from additional locations. The image capturing device 12 is preferably a video or single-image camera, such as a CCD camera, which captures frame-by-frame images in either color or black and white. The image capturing device 12 may be either analog or digital. If an analog device is used, the image is digitized using any commercially available or custom-made frame gabber known in the art. While any number of frames per second may be taken by the image capturing device 12, preferably the number of frames per minute does not drop below five (5) frames per second. Preferably, the resolution of the image(s) taken by the image capturing device 12 is such that the objects of interest in the image are about twenty (20) pixels by thirty (30) pixels. Higher resolution may undesirably slow the processing of the image, while too low a resolution may make the processing of the image unreliable. If a higher resolution image capturing device 12 is used, the resultant image(s) may be down-sampled to obtain a more optimal image resolution.

A field of view 18 of the image capturing device 12 is focused on the individuals 1 contained within the area of interest 20. Preferably, the field of view 18 is trained on a counting area 24 which surrounds a virtual gate 22, both of which will be discussed in greater detail below.

The image capturing device 12 is connected to an image processor 14 via a link 16. Link 16 may be any image-transferring capable link known in the art, such as a video cable or a wireless transmission link. One end of link 16 is connected to the image capturing device 12 while the other end of link 16 is connected to the image processor 14.

The image processor 14 may be any type of processor capable of executing an algorithm for interpreting the image(s) taken by the image capturing device 12. For example, the image processor 14 may be a PC, a laptop, a processing chip integrated into an instrument panel or station, or the like. Optionally, the image processor 14 is connected to peripheral equipment such as recording devices, external communication links, and power sources.

Figure 2:
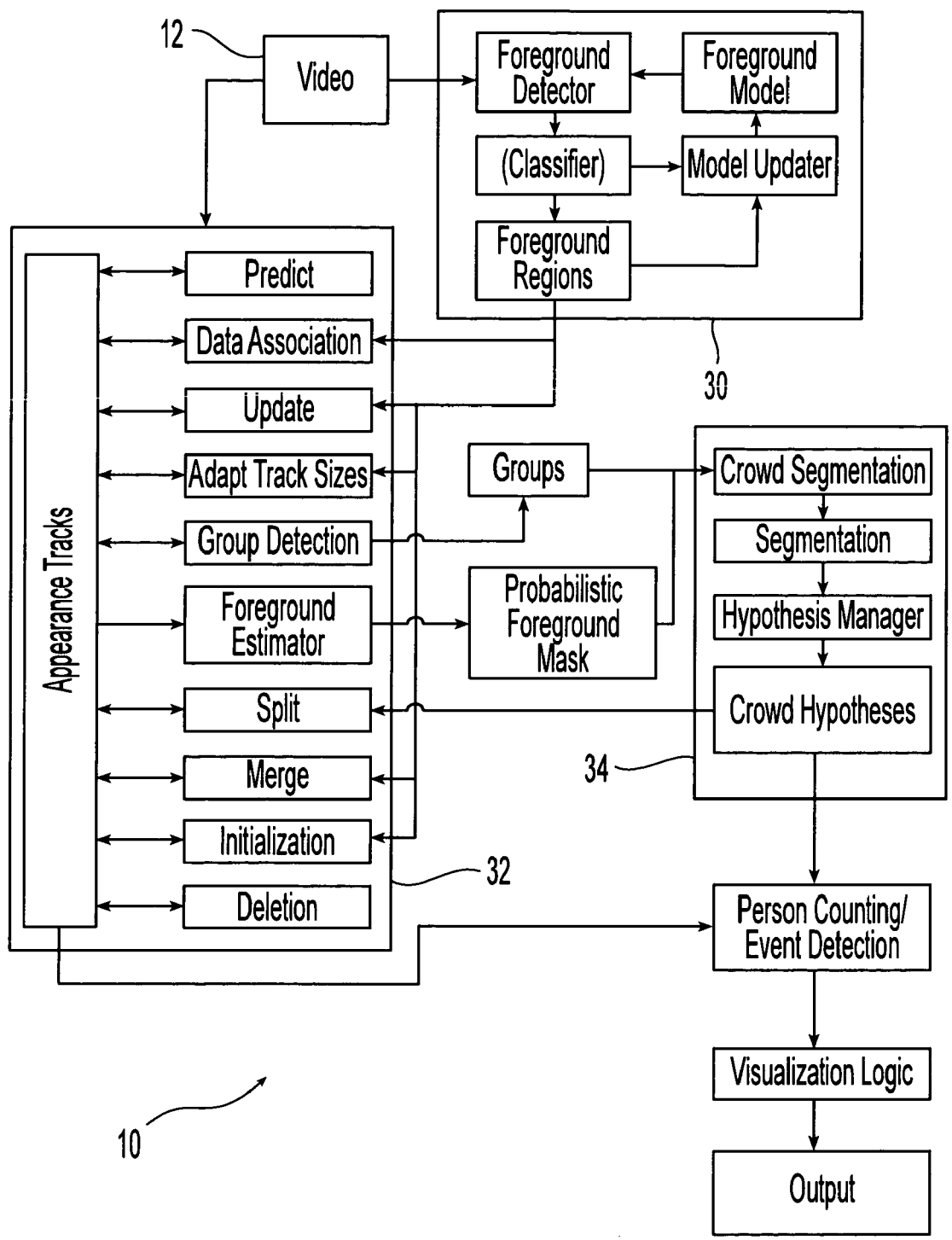
FIG. 2 is a block diagram showing the functionality of the system of FIG. 1.

As shown in FIG. 2, the image processor 14 is configured or programmed to execute an image processing algorithm which includes three main components: a low-level foreground detection module 30, a tracking module 32, and a crowd segmentation module 34. All three modules 30, 32, 34 are combined into a tightly coupled framework. In basic operation, once the image processor 14 has received a digital frame image from the image capturing device 12, the foreground detection module 30 isolates the crowd elements from the background elements of the image. The tracking module 32 then notes the groups of individuals 1 and generates a probabilistic foreground mask to determine the direction in which the groups of individuals 1 are moving based on historical data from the preceding frame images. The segmentation module 34 then divides the group into discrete individuals 1. The tracking module 32 and the segmentation module 34 operate together in an iterative fashion to produce likely counting and other determinative scenarios. The algorithms and other preferred methodologies used by each of these modules 30, 32, 34 is discussed in greater detail below.

The foreground detection module 30 may be any such module known in the art. Preferably, the foreground detection module 30 is a low level foreground detection module. Such a low level foreground detection module is described in Chris Stauffer and W. E. L. Grimson, *Adaptive Background Mixture Models for Real-time Tracking*, CVPR99, vol. II, pp. 246-252, which is incorporated herein in its entirety by reference.

Once the foreground detection module 30 has roughly identified the crowds and the background scene, the tracking module 32 preferably uses an adaptive appearance-based approach to note the direction of movement of the individuals 1 in the crowd from frame to frame.

The tracking module 32 includes two parts: a multiple hypothesis tracker as described above, and a data association module. Given enhanced segmentation results from neighboring frames developed iteratively with the segmentation module described in greater detail below, an algorithm is used to find the optimal data association. The algorithm used may be any algorithm known in the art such as the well-known Hungarian algorithm, more fully described in Paul E. Black, *Hungarian Algorithm*, DICTIONARY OF ALGORITHMS AND DATA STRUCTURES, National Institute of Standards and Technology (NIST), Paul E. Black, ed. accessible at http://www.nist.gov/dads/HTML/HungarianAlgorithm.html, last accessed on Nov. 17, 2005. The two-dimensional distance between a pair of segmented individuals from the neighboring frames is used in computing the cost matrix for the Hungarian algorithm. Once the data association is performed for every neighboring pair of frames, the track 3 of each segmented individual 1 over time can be determined.

The tracking module 32 can follow individuals 1 within a group as well as other components of the frame of reference to develop a track 3 or history of the movement of the group or individual 1 over a series of frames, i.e., over time. In other words, track 3 is the vector for the individual 1. For example, in FIG. 1, if the individuals 1 are moving in the direction of the arrow, then tracks 3 can be developed by comparing the image from a frame image with its adjacent frame images. Various algorithms may be used within the tracking module 32 for initiating, merging, splitting and deleting tracks 3. For example, each track 3 may be modeled by a signature such as a color signature, an appearance template, and a probabilistic target mask. The foreground mask used in the tracking module 32 is preferably an autoregressive estimate of the foreground information as obtained in the previous stage.

The tracking module 32 may use one of various methods for overcoming occlusion problems, i.e., the obscuring of one individual 1 in the field of view 18 from the image capturing device 12 by another individual 1. For example, the tracking module 32 handles short term occlusion between isolated tracks 3, but groups closely spaced targets together into group tracks 3. Only foreground regions which are large enough to contain a number of people and image regions that contain closely spaced tracks 3 are forwarded to the segmentation module 34 for further analysis. In addition, an improved foreground region image is composed based on the information maintained by the tracking module 32 and also supplied to segmentation module 34. The motivation for this is so that the properties of the target masks compare favorably to the direct estimate of the foreground. First, an autoregressive process that is preferably used to maintain the target masks suppresses high frequency variations and noise in the foreground image. Second, since the target masks are estimated from the foreground image relative to the moving tracks 3, foreground region information is effectively integrated across multiple images along the motion paths of targets, thereby resulting in more accurate overall estimates.

Tracking according to the above description generally utilizes knowledge of the geometry of the area of interest 20 and the parameters of the image capturing device 12 so that a connection between the image taken and the world measurements may be established. This knowledge can constrain the analysis such that solutions to the relevant equations are more readily determined. However, geometric information is rarely readily available for a given area of interest 20 and may be difficult to obtain after a system such as system 10 is installed. Therefore, system 10 includes an autocalibration approach that utilizes information from the observed scene.

One such approach to autocalibration is based on vanishing points and vanishing lines that can be obtained from tracking the individual targets in the image. Preferably, however, system 10 includes a methodology for autocalibration that estimates the foot-to-head plane homology, which obtains the internal and external calibration parameters of the camera from head and foot location measurements. The estimation of the homology may be performed using any method known in the art, for example using a Bayesian approach which can perform the estimation while handling measurement uncertainties, outliers as well as prior information. The full posterior distribution of calibration parameters given the measurements is estimated, which allows making statements about the accuracy of both the calibration parameter and the measurements involving the calibration parameters.

Figure 3C:
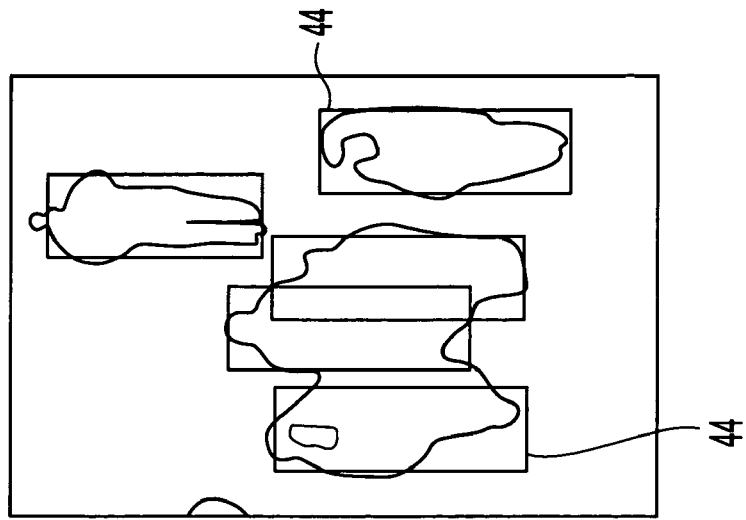
FIG. 3C is the image of FIG. 3A showing segmentation of the image into individuals.
Figure 3B:
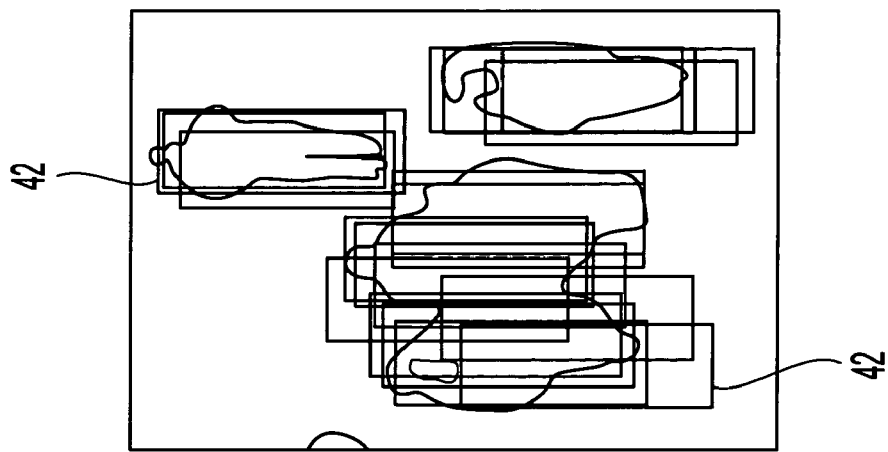
FIG. 3B is the image of FIG. 3A showing defined clique sets.

The foot-to-head plane homology is further described below, including the assumptions involved. When observing people, each foot location on the ground plane corresponds to exactly one location in the so-called head plane which is located at a height h parallel to the observed ground plane. It is assumed for the purposes of simplifying the analysis that all observed individuals 1 have the same average height h. In other words, the image processor 32 assumes that each individual 1 has the same geometric shape with respect to the ground plane. For example, when processing an image of a group of people, it can be assumed that each person is a rectangle, where the long legs of the rectangle represent the height of the person and where all of the rectangles have long legs of equal lengths. This concept is shown in FIGS. 3B and 3C, where rectangles 42 and 44 represent individuals.

It can be shown that the homography that maps the images of ground planes to the images of the corresponding points in the head plane is in fact a homology H given by the following equation, Eq. 1:

$$H = \prod -\frac{h}{z}\frac{\tilde{v}^{\infty}(\tilde{l}^{\infty})^T}{(\tilde{v}^{\infty})^T \tilde{l}^{\infty}} \qquad \text{Eq. 1}$$

where z is the height of the camera above the origin of the ground plane, $\tilde{v}^{\infty}$ is the vanishing point and $\tilde{l}^{\infty}$ is the horizon line. It can be shown that the horizon line and the vanishing point are given by the following equations, Eq. 2 and Eq. 3, respectively:

$$\tilde{l}^{\infty} = \left[\sin(\rho) - \cos(\rho)\frac{f}{\tan(\theta)}\right] \qquad \text{Eq. 2}$$

$$\tilde{v}^{\infty} = [f\sin(\rho)\sin(\theta) - f\cos(\rho)\sin(\theta)\cos(\theta)] \qquad \text{Eq. 3}$$

where ρ is the roll angle of a camera, θ is the tilt of the camera towards the ground plane and f is the camera focal length. Using standard assumptions about the remaining parameters of the camera, this foot-to-head plane homology provides a complete metric calibration of the camera with respect to the ground plane.

The preferred autocalibration approach including a description of the standard assumptions are discussed in Nils Krahnstoever, Paulo R. S. Mendonca, *Bayesian Autocalibration for Surveillance*, Tenth IEEE International Conference on Computer Vision (ICCV'05), vol. 2, October 2005, which is incorporated herein by reference in its entirety. A summary of the method is included here. Given a sufficient number of isolated people observations, including head and foot image location measurements with associated measurement uncertainties, an initial foot to head homography is estimated using a standard Direct Linear Transformation approach, as is discussed in R. Hartley and A. Zisserman, *Multiple view geometry computer vision*, Cambridge University Press, pp. 71-76 (2000), which is incorporated herein by reference in its entirety. The eigenvalue structure of the targeted homography is exploited to obtain the closest foot-to-head homology consistent with the data. Finally, the initial homology estimate is refined in a Bayesian framework, taking the noise and other nuisance variables into consideration, to estimate the posterior distribution of the camera parameters given the measurements.

Segmentation module 34 preferably uses an algorithm that processes all regions in the image that the tracking module 32 has judged to contain groups of individuals. The resulting segmentation observation $\hat{S}^t$ at frame t contains information about the detected number of people and their location in the image given by the following equation, Eq. 4:

$$\hat{X}^t = \{\hat{n}^t, (\hat{x}_i^t, \hat{y}_i^t), i=0, \ldots, \hat{n}^t\} \quad \text{Eq. 4}$$

As discussed above, noise in the feature extraction process as well as inherent ambiguities leads the estimate $\hat{X}^t$ to deviate from the true state $\hat{S}^t$. To reduce the error in the resulting segmentation, the estimated values are processed by a simplified multiple hypothesis tracker, such as the one described in S. Blackman and R. Popoli, DESIGN AND ANALYSIS OF MODERN TRACKING SYSTEMS, Artech House, Norwood Mass., pp. 360-369 (1999), which is incorporated herein in its entirety by reference. Within each group, individual tracks 3 may be smoothed using a constant velocity Kalman filter.

Figure 3A:
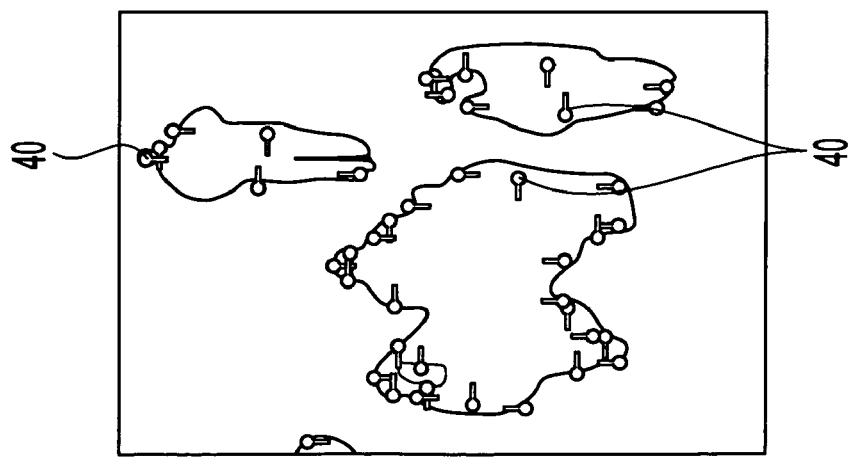
FIG. 3A is an image captured by the system of FIG. 1, where the image features have been labeled.

Although any method known in the art can be used, a model based approach to crowd segmentation is preferred. Description of the steps involved in an exemplary process is given with reference to FIGS. 3A, 3B and 3C. Given a foreground segmentation, a set of low level image features 40, $Z=\{z_i\}$, are extracted. In addition, an exhaustive set of feature groups or cliques 42 $C=\{c_i\}$ is hypothesized. Each grouping corresponds to a potential individual. These groupings are constrained by a geometric shape model which is parameterized by $X=\{x_i\}$; here, the geometric shape model is a rectangle. Each feature is assigned to a single grouping, and the shape parameters of each grouping is then estimated. An assignment vector $V=\{v_i\}$ establishes the feature assignments. A likelihood function $P(Z, V; X)$ is defined based on pair-wise and single assignments of features to groupings with shape parameters X. The goal, therefore, is to determine maximum likelihood estimates of both V and X to establish discrete segmentations 44, such as shown in FIG. 3C for an estimation of X* and one sample of V.

A formulation based on Expectation Maximization (EM) is used, where V is viewed as a hidden variable. EM provides a method to estimate a distribution $\tilde{P}(V)$ as well as an estimate of X. Once this has been achieved, likely values of V can be selected by sampling $\tilde{P}(V)$. Estimates of $\tilde{P}(V)$ and X are found by maximizing the free energy equation, given by:

$$F(\tilde{P},X) = E_P[\log P(V,Z;X)] + H(\tilde{P}) \quad \text{Eq. 5}$$

In order to regularize the optimization process, a temperature term T is introduced:

$$F(\tilde{P},X) = E_P[\log P(V,Z;X)] + TH(\tilde{P}) \quad \text{Eq. 6}$$

For example, initially, T is set to a very large value that favors the entropy term. As a result, the initial estimate of $\tilde{P}(V)$ can be set to a uniform distribution. An annealing process may then be performed by iteratively decreasing T. At each iteration, both an Expectation or E-step and a Maximization or M-step may be performed. In the E-step, X is fixed to its current value and the free energy is optimized with respect to $\tilde{P}(V)$. In the M-step, $\tilde{P}(V)$ is fixed and optimization is performed with respect to X. The application of the mean field approximation to $\tilde{P}(V)$ allows for gradient accent in the E-step. The use of a simplistic shape model allows for the use of an exhaustive search in the M-step. As T approaches 0, the estimate of $\tilde{P}(V)$ converges to a delta function centered on a local maxima of the likelihood function $P(Z, V; X)$. This form of optimization is similar to soft assign.

Given a video sequence of interest, the segmentation module 34 in the previous section classifies the crowd in each frame into multiple individuals 1. However, in order to determine the number of individuals 1 and their movements, the trajectories of each individual 1 is determined over time. As such, the tracking function and crowd segmentation function described above are integrated. The crowd segmentation results may also, then, be stabilized and enhanced. Over a long sequence, the crowd segmentation might not obtain the correct number of individuals 1 in certain frames, due to occlusion. Therefore, the information from the tracking module is used to smooth the segmentation result such that the segmentation result and the tracking result align.

In order to count individuals 1 within the group effectively, the virtual gate 22 is imposed on the image. Given a scene captured by the image capturing device 12, a user and/or the image processor 14 draws a line at any location in the field of view. This line serves as the virtual gate 12. The algorithm then continuously counts how many individuals 1 cross this arbitrarily selected line. The virtual gate 22 may have any shape, including a straight horizontal line, a straight vertical line, a straight line having an angle relative to the horizontal and/or vertical plane, a curved line, a closed polygonal shape, or the like.

Tracking an individual 1 if no occlusion occurs can be relatively simple. However, groups of individuals 1, such as people in a crowd, tend to move together. When this occurs at the virtual gate 22, the segmentation module 34 for each individual frame might not determine the same number of individuals 1.

Figure 4:
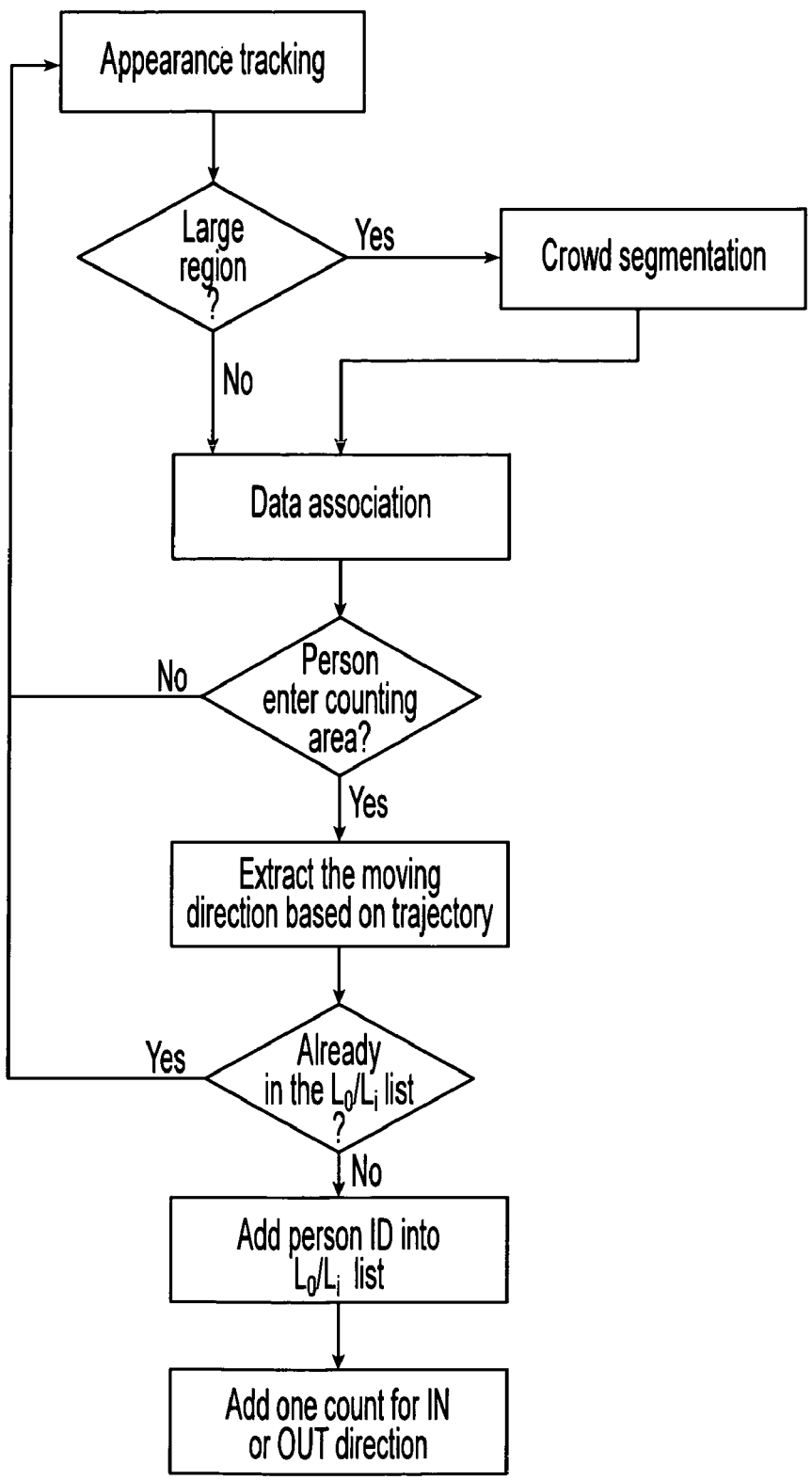
FIG. 4 is a flowchart showing an embodiment of an algorithm used by the system of FIG. 1.

Once a segmented individual 1 enters the counting area 24, the counting module begins to function. The counting module performs two basic tasks: retrieve the trajectory of the individual 1 and determine the moving direction of the individual 1 with respect to the virtual gate 22, i.e., whether the individual 1 is entering or exiting the virtual gate 22. Many different methods may be employed to determine the direction of track 3, any of which is suitable for use in embodiments of the invention. For example, comparing two instances of an individual's 1 location along the direction perpendicular to the virtual gate 22 may be used to determine the direction of track 3. Alternatively, an identification number ID may be added to a stored list of individuals 1 entering the virtual gate (Li) or exiting the virtual gate (Lo), depending upon the desired (arbitrary) direction. The purpose of these two lists is to avoid multiple counting when an individual 1 remains inside the counting area 24 in future frames. Furthermore, if the individuals 1 are associated with the ListIn Li and ListOut Lo lists based on the appearance information, the duration of stay of the individual 1 within the area of interest 20. FIG. 4 shows a flowchart of this iterative process.

To test the performance of system 10 as a people counter, a single camera (the image capturing device 12) was mounted on the second floor of a building and pointed at the entrance of the building (the area of interest 20). A number of individuals 1 were asked to walk along the entrance in different combinations of groups. The combinations were set up so that both easy and difficult scenarios for people counting were presented. An easy scenario is one in which, for example, a single individual walks through the counting area 24. A difficult scenario is one in which, for example, a plurality of people walk together through the counting area 24 in a cluster, or when small groups of people walk toward each other.

Figure 5:
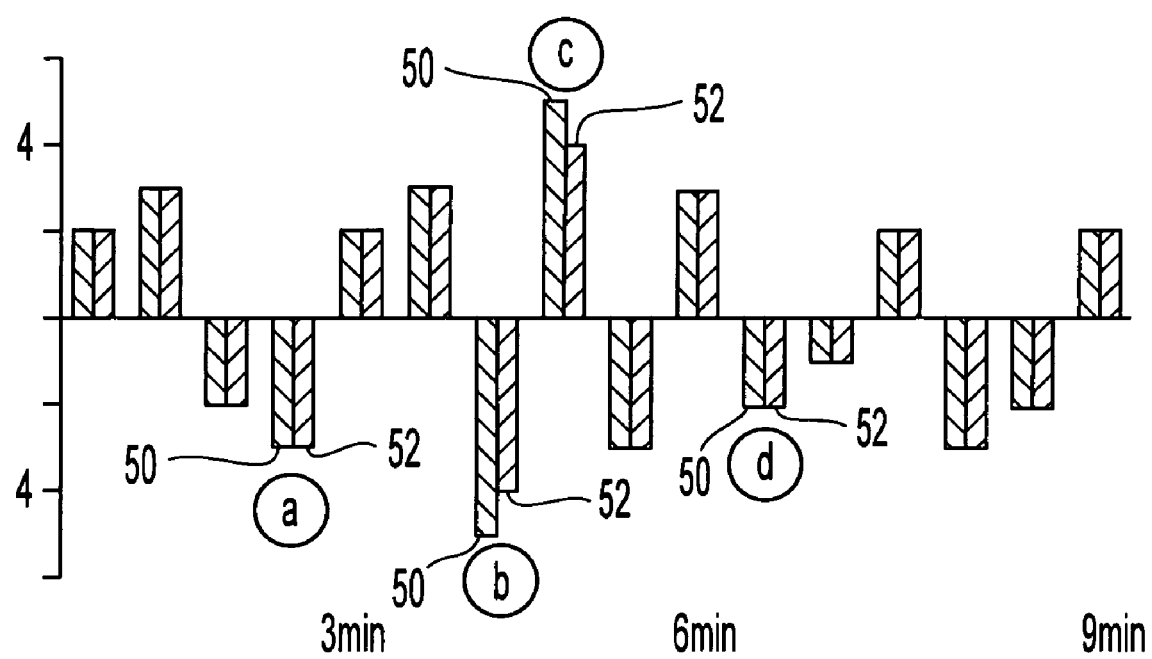
FIG. 5 is a graph reflecting experimental data collected by an implementation of the system of FIG. 1.
Figure 6A:
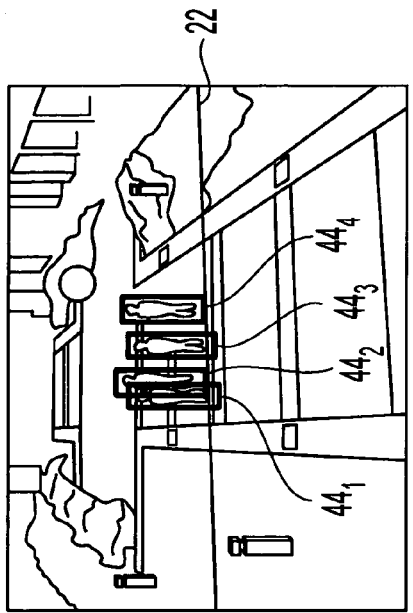
FIGS. 6A-6D are experimental frame images corresponding to points a-d shown in FIG. 5.
Figure 6B:
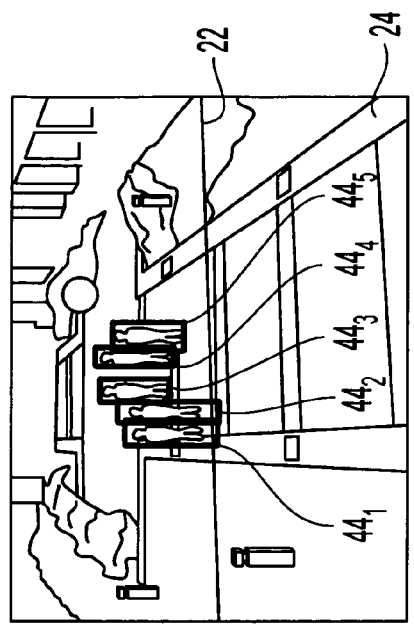
Figure 6C:
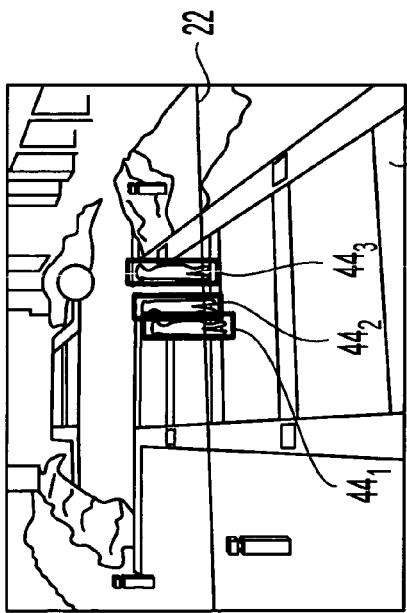
Figure 6D:
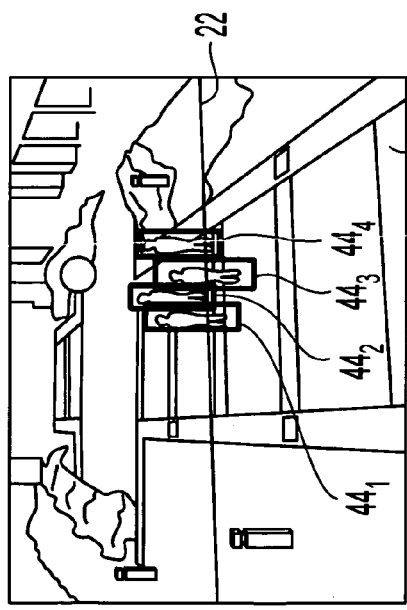

A 10-minute video clip is captured and analyzed, where people pass the selected virtual gate 22 times during the testing sequence. At each instance of passing the virtual gate 22, a true number of people is plotted as histogram bar 50, and the count from system 10 is plotted as histogram bar 52. The test results are shown in FIG. 5, with positive numbers referring to people going "in" the virtual gate 22 and negative numbers refer to people going "out" of the gate 22. FIGS. 6A-6D are individual video frames that correspond to points a-d on the graph in FIG. 5.

The data collected reflects the accuracy of system 10. In most of the instances, system 10 detects the correct number of individuals, i.e., histogram bar 50 equals histogram bar 52. In case a, three individuals are present in the counting area 24 and are moving out of virtual gate 22, as is shown by histogram bar 50 at point a in FIG. 5 and shown in FIG. 6A. System 10 successfully counts all three individuals $44_1$, $44_2$ and $44_3$, as is shown by histogram bar 52 at point a in FIG. 5, in spite of some occlusion while passing the virtual gate 22. In case b, five individuals are present in the counting area 24 and are moving out of virtual gate 22, as is shown by histogram bar 50 at point a in FIG. 5 and shown in FIG. 6B. However, due to severe occlusion, system 10 successfully counts only four individuals $44_1$, $44_2$, $44_3$, $44_4$, as is shown by histogram bar 52 at point b in FIG. 5. In case c, five individuals are present in the counting area 24 and are moving into virtual gate 22, as is shown by histogram bar 50 at point c in FIG. 5 and shown in FIG. 6C. However, due to severe occlusion, system 10 successfully counts only four individuals $44_1$, $44_2$, $44_3$, $44_4$, as is shown by histogram bar 52 at point c in FIG. 5. In case d, five individuals are present in the counting area 24, two of which are moving out of virtual gate 22 and three of which are moving into virtual gate 22. System 10 successfully counts all five individuals $44_1$, $44_2$, $44_3$, $44_4$, $44_5$, as is shown by histogram bar 52 at point d in FIG. 5, in spite of some occlusion while passing the virtual gate 22. In cases such as cases b and c, the use of multiple cameras could provide views in which the nearly completely occluded individuals are not occluded.

Referring now to FIGS. 7A-7F, system 10 may also be used to detect behavioral events. For example, it may be of interest to detect automatically dangerous behavior, such as the entry of an individual into a restricted area, such as a person leaning over the edge of a subway platform or illicitly entering a security area. System 10 can make these detections by detecting the individuals, as described above with respect to FIG. 1, detecting the boundary 23 of the zone of interest 25, e.g., the edge of a subway platform, and detecting when a portion of an individual 1 extends into the zone of interest 25.

The boundary 23 of a zone of interest 25 can generally be defined by a simple line. However, as most image capturing devices view a scene from an angle, the determination of whether or not an individual has crossed into a zone of interest 25 is more complex than merely determining whether or not an individual has crossed the line defining the boundary of the zone of interest 25. For example, the top individual 64 in FIG. 7A apparently crosses the boundary 23, but is not actually near the zone of interest 25. In other words, system 10 should account for depth perception while still utilizing a single frame of reference.

Figure 7A:
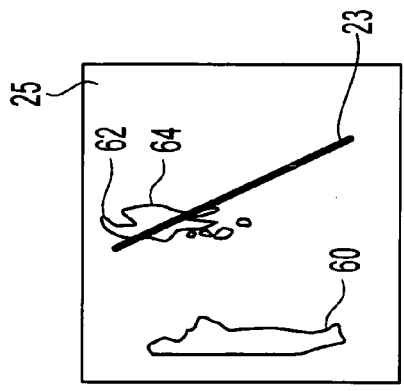
FIGS. 7A-7F are segmented frame images of the system of FIG. 1 which reflect event detection capabilities thereof.
Figure 7B:
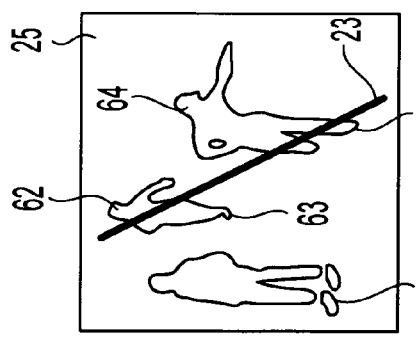

The assumption is made, therefore, that proximity to the boundary 23 is only determined when an individual's foot is near the boundary 23. For the subway scenario, the foot location can be modeled as the lower-left corner 65 of a person segmentation as shown in FIG. 7B. For a given image location, a "foot strength" factor can be determined as a response to a corner-detection template. To detect proximity to the boundary 23, foot strength is measured along the boundary 23 line. Non-maximal suppression and thresholding then yield foot locations. Detecting a leaning-over event is then noted by determining if a part of the person segmentation falls to the right of a line extending upward from the defined foot location 65, as happens in FIG. 7B with individual 64, and in FIG. 7C and FIG. 7F (which is a crowd segmented version of FIG. 7C) with individuals 62, 64.

Figure 7C:
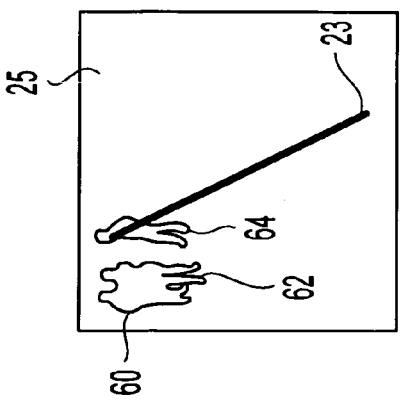
Figure 7D:
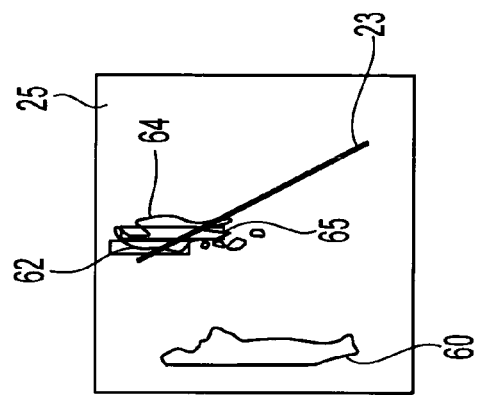
Figure 7E:
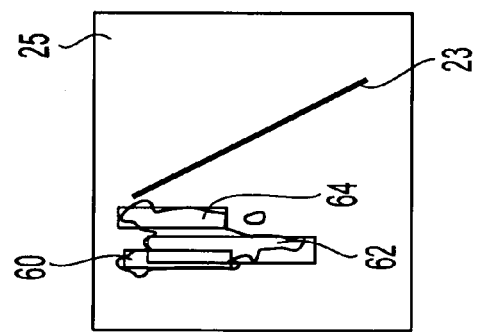
Figure 7F:
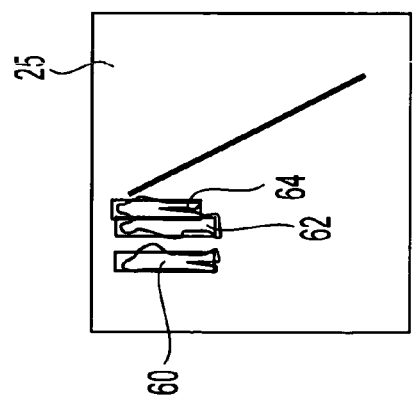

An additional step is taken to assure accuracy in cases of occluding segmented individuals, i.e., when one individual blocks another in the field of view. The crowd segmentation module makes a determination of the location of the individuals within the crowd. FIG. 7C shows a situation where the first person partially obscures the second person, so that the foot location, and, therefore, the foot strength, of the second person cannot be determined. After applying crowd segmentation however, it can be determined that the foot of the second person is also at the platform edge, and that his head is beginning to cross into the dangerous area, as shown in FIG. 7F.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A method for counting at least one individual in a crowd comprising the steps of:
   (i) calibrating an image capturing device and an image processing device;
   (ii) capturing a flame of an image with the image capturing device;
   the image processing device performing the steps comprising:
   (iii) drawing a virtual gate through the image;
   (iv) applying a foreground estimation module to the image;
   (v) applying a tracking module to the image;
   (vi) applying a crowd segmentation module to the image to separate the individual from the crowd;
   (vii) counting the individual;
   wherein the crowd segmentation module in step (v) comprises the steps of
      (i) identifying at least one low level image feature;
      (ii) hypothesizing at least one clique from the low level image features; and
      (iii) constraining the clique according to a geometric shape model;
      wherein the constraining of step (iii) comprises:
         (iv) assigning each low level image feature to a single clique;
         (v) establishing future assignments according to an assignment vector based on a likelihood function;
         wherein the likelihood function is a free energy equation.

2. The method of claim 1, wherein the calibration of step (i) utilizes foot-to-head plane homology.

3. The method of claim 1, wherein the tracking module comprises applying the Hungarian algorithm.

4. The method of claim 1, wherein the tracking module and the segmentation module are integrated.

5. The method of claim 1, wherein the individual comprises a person.

* * * * *

UNITED STATES PATENT AND TRADEMARK OFFICE
CERTIFICATE OF CORRECTION

PATENT NO. : 7,596,241 B2 Page 1 of 1
APPLICATION NO. : 11/290672
DATED : September 29, 2009
INVENTOR(S) : Rittscher et al.

It is certified that error appears in the above-identified patent and that said Letters Patent is hereby corrected as shown below:

In Column 7, Line 48, in Equation 5, delete " $F(\tilde{P},X)=E_P[\log P(V,Z;X)]+H(\tilde{P})$ " and insert -- $F(\tilde{P},X)=\bar{E}_{\tilde{P}}[\log P(V,Z;X)]+H(\tilde{P})$ --, therefor.

In Column 7, Line 53, in Equation 6, delete " $F(\tilde{P},X)=E_P[\log P(V,Z;X)]+TH(\tilde{P})$ " and insert -- $F(\tilde{P},X)=E_{\tilde{P}}[\log P(V,Z;X)]+TH(\tilde{P})$ --, therefor.

In Column 10, Line 34, in Claim 1, delete "flame" and insert -- frame --, therefor.

In Column 10, Line 45, in Claim 1, delete "of" and insert -- of: --, therefor.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,596,241 B2
APPLICATION NO. : 11/290672
DATED : September 29, 2009
INVENTOR(S) : Rittscher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 973 days.

Signed and Sealed this

Twenty-eighth Day of September, 2010

David J. Kappos
*Director of the United States Patent and Trademark Office*